(12) United States Patent
Sugiura

(10) Patent No.: US 11,909,179 B2
(45) Date of Patent: Feb. 20, 2024

(54) SPARK PLUG AND INTERNAL COMBUSTION ENGINE EQUIPPED WITH THE SAME

(71) Applicant: DENSO CORPORATION, Kariya (JP)

(72) Inventor: Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/175,172

(22) Filed: Feb. 27, 2023

(65) Prior Publication Data

US 2023/0216279 A1 Jul. 6, 2023

Related U.S. Application Data

(63) Continuation of application No. PCT/JP2021/030927, filed on Aug. 24, 2021.

(30) Foreign Application Priority Data

Sep. 2, 2020 (JP) .................. 2020-147246

(51) Int. Cl.
*H01T 13/54* (2006.01)

(52) U.S. Cl.
CPC .................... *H01T 13/54* (2013.01)

(58) Field of Classification Search
CPC ...................................... H01T 13/54
See application file for complete search history.

(56) References Cited

U.S. PATENT DOCUMENTS

| 4,416,228 A * | 11/1983 | Benedikt ............. F02B 19/1009 |
| | | 123/169 EL |
| 4,930,473 A * | 6/1990 | Dietrich .................. F02B 19/12 |
| | | 123/169 EL |
| 7,104,246 B1 * | 9/2006 | Gagliano ................ F02B 19/12 |
| | | 123/169 PA |
| 8,915,227 B2 * | 12/2014 | Johng ..................... F02P 13/00 |
| | | 123/262 |
| 9,004,042 B2 * | 4/2015 | Tozzi ..................... F02B 19/12 |
| | | 123/297 |
| 9,172,217 B2 * | 10/2015 | Hampson ................ F02P 15/10 |
| 10,024,220 B2 * | 7/2018 | Sotiropoulou .......... F02B 19/12 |
| 10,174,667 B1 | 1/2019 | Cress |
| 2018/0294626 A1 | 10/2018 | Niessner et al. |

FOREIGN PATENT DOCUMENTS

| DE | 10 2017 202 238 | 2/2018 |
| DE | 10 2018 211 009 | 1/2020 |
| JP | 2009-270539 | 11/2009 |
| JP | 2016035854 A * | 3/2016 |
| WO | WO-2020235332 A1 * | 11/2020 | ............. F02B 19/12 |

* cited by examiner

*Primary Examiner* — Mary Ellen Bowman
(74) *Attorney, Agent, or Firm* — Nixon & Vanderhye P.C.

(57) ABSTRACT

In a spark plug, at least one injection hole serves as a ground-directed injection hole arranged to face a facing side of a ground electrode. An extension line of the center axis of the at least one ground-directed injection hole intersects with the facing side of the ground electrode at an intersection point. The facing side of the ground electrode has a closer region closer to the projection-end edge of the ground electrode than the intersection point is. The closer region of the facing side intersects with the extension line of the center axis of the ground-directed injection hole at a predetermined angle as viewed in the axial direction of the spark plug. The predetermined angle being an obtuse angle.

14 Claims, 11 Drawing Sheets

SPARK PLUG AND INTERNAL COMBUSTION ENGINE EQUIPPED WITH THE SAME

CROSS REFERENCE TO RELATED APPLICATIONS

The present application is a bypass continuation application of currently pending international application No. PCT/JP2021/30927 filed on Aug. 24, 2021 designating the United States of America, the entire disclosure of which is incorporated herein by reference, the international application being based on and claiming the benefit of priority from Japanese Patent Application No. 2020-147246 filed on Sep. 2, 2020.

TECHNICAL FIELD

The present disclosure relates to spark plugs and internal combustion engines, each of which is equipped with such a spark plug.

BACKGROUND

For example, German Patent Application Publication No. 102017107679 discloses a sub-chamber spark plug. Specifically, the ground electrode of the spark plug disclosed in the German Patent Publication is secured to an end of the housing of the spark plug, and one side of the ground electrode and a corresponding one side of the center electrode of the spark plug, which face each other, define a discharge gap therebetween.

The spark plug disclosed in the German Patent Publication is configured to enable (i) the discharge gap to be adjustable after the ground electrode is fixedly assembled to the housing, and (ii) the plug cover for covering the discharge gap, to be secured to the housing after the discharge gap is adjusted to a desired length.

SUMMARY

Arrangement of the spark plug disclosed in the German Patent Publication is determined without consideration of an airflow in the sub-chamber. The spark plug disclosed in the German Patent Publication therefore has a room for improvement of ignitability of the spark plug.

From this viewpoint, the present disclosure aims to provide spark plugs, each of which has improved ignitability, and internal combustion engines, each of which is equipped with such a spark plug.

A first exemplary measure according to the present disclosure provides a spark plug for an internal combustion engine. The spark plug has an axial direction and includes a tubular insulator having a tip-side end, and a center electrode having one side and a tip-side end. The center electrode is disposed inside the insulator with the tip-side end protruding outwardly from the tip-side end of the insulator. The spark plug includes a tubular housing that has a tip-side end and retains the insulator thereinside, a ground electrode having a stationary end, a projection-end edge opposite to the stationary end, and one side, and a plug cover mounted to the tip-side end of the housing to define a sub-chamber between the plug cover and the tip-side end of the housing.

The stationary end of the ground electrode is mounted to the tip-side end of the housing. The projection-end edge of the ground electrode projects to be located in the sub-chamber such that the one side of the ground electrode serves as a facing side facing the one side of the center electrode, resulting in a discharge gap being formed between the facing side of the ground electrode and the one side of the center electrode.

The plug cover has formed therethrough at least one injection hole that enables the sub-chamber to communicate with an outside thereof, the at least one injection hole having a center axis. The center axis of the at least one injection hole is inclined with respect to a radial direction of the spark plug as viewed in the axial direction of the spark plug.

The at least one injection hole serves as a ground-directed injection hole arranged to face the facing side of the ground electrode, and an extension line of the center axis of the at least one ground-directed injection hole intersects with the facing side of the ground electrode at an intersection point. The facing side of the ground electrode has a closer region closer to the projection-end edge of the ground electrode than the intersection point is. The closer region of the facing side intersects with the extension line of the center axis of the ground-directed injection hole at a predetermined angle as viewed in the axial direction of the spark plug. The predetermined angle being an obtuse angle.

A second exemplary measure according to the present disclosure provides an internal combustion engine. The internal combustion engine of the second exemplary measure includes a main chamber, and a spark plug according to the first exemplary measure. The plug cover has an outer peripheral surface, and the spark plug is arranged such that the outer peripheral surface of the plug cover is exposed in the main chamber. The internal combustion engine of the second exemplary measure include an injector configured to directly spray fuel in the main chamber.

The spark plug is arranged such that a fuel-containing flow including the fuel sprayed from the injector during a compression stroke of the internal combustion engine is directed toward an outer opening of the ground-directed injection hole.

A third exemplary measure according to the present disclosure provides an internal combustion engine. The internal combustion engine of the third exemplary measure includes a main chamber, and a spark plug according to the first exemplary measure. The plug cover having an outer peripheral surface, and the spark plug is arranged such that the outer peripheral surface of the plug cover is exposed in the main chamber.

The spark plug is arranged such that an outer opening of the ground-directed injection hole is directed toward an upstream side of an airflow formed in the main chamber.

The center axis of the at least one injection hole is inclined with respect to a radial direction of the spark plug as viewed in the axial direction of the spark plug. This enables an airflow introduced into the sub-chamber through the at least one injection hole or an airflow flowing out from the sub-chamber through the at least one injection hole to produce a swirl flow in the sub-chamber.

The predetermined angle at which the closer region of the facing side intersects with the extension line of the center axis of the ground-directed injection hole is an obtuse angle as viewed in the axial direction of the spark plug. This enables an airflow guided by the facing side into the sub-chamber to extend more easily a spark generated in the discharge gap, making it possible to improve the ignitability of the spark plug.

Let us assume that the internal combustion engine is configured to generate a spark in the discharge gap during an expansion stroke. In this assumption, an airflow flowing out from the sub-chamber through the ground-directed injection hole enables a spark generated in the discharge gap to expand more easily, making it possible to improve the ignitability in the sub-chamber.

This expansion of the spark enables the firing position of an air-fuel mixture to be easily closer to the ground-directed injection hole. This therefore makes it possible to, even if the internal combustion engine is operating under a low temperature condition of the sub-chamber, reduce a cooling loss of the spark, thus increasing the strength of a flame jet issuing into the main chamber.

In the internal combustion engine according to the second exemplary measure, the spark plug is arranged such that the fuel-containing flow including the fuel sprayed from the injector is directed toward the outer opening of the ground-directed injection hole. This enables an air-fuel mixture having a high fuel density to be more easily introduced from the ground-directed injection hole into the sub chamber. This results in the air-fuel mixture with a high fuel density reaching the discharge gap more easily, making it possible to improve the ignitability of the spark plug.

In the internal combustion engine according to the third exemplary measure, the spark plug is arranged such that the outer opening of the ground-directed injection hole is directed toward the upstream side of the airflow formed in the main chamber. This enables the airflow to be more easily introduced from the main chamber to the sub-chamber via the ground-directed injection hole. This enables the airflow guided by the facing side to extend more easily a spark generated in the discharge gap reliably, making it possible to improve the ignitability of the spark plug.

As described above in detail, each of the first to third exemplary measures provides the spark plug having improved ignitability and the internal combustion engine equipped with the spark plug.

BRIEF DESCRIPTION OF THE DRAWINGS

The foregoing and other objects, features, and advantages of the present disclosure will become more apparent from the following detailed description with reference to the accompanying drawings, in which.

EMBODIMENTS

First Embodiment

The following describes a spark plug 1 and an internal combustion engine 10, which will be referred to simply as an engine 10, equipped with the spark plug 1 according to the first embodiment with reference to FIGS. 1 to 8.

Figure 1:
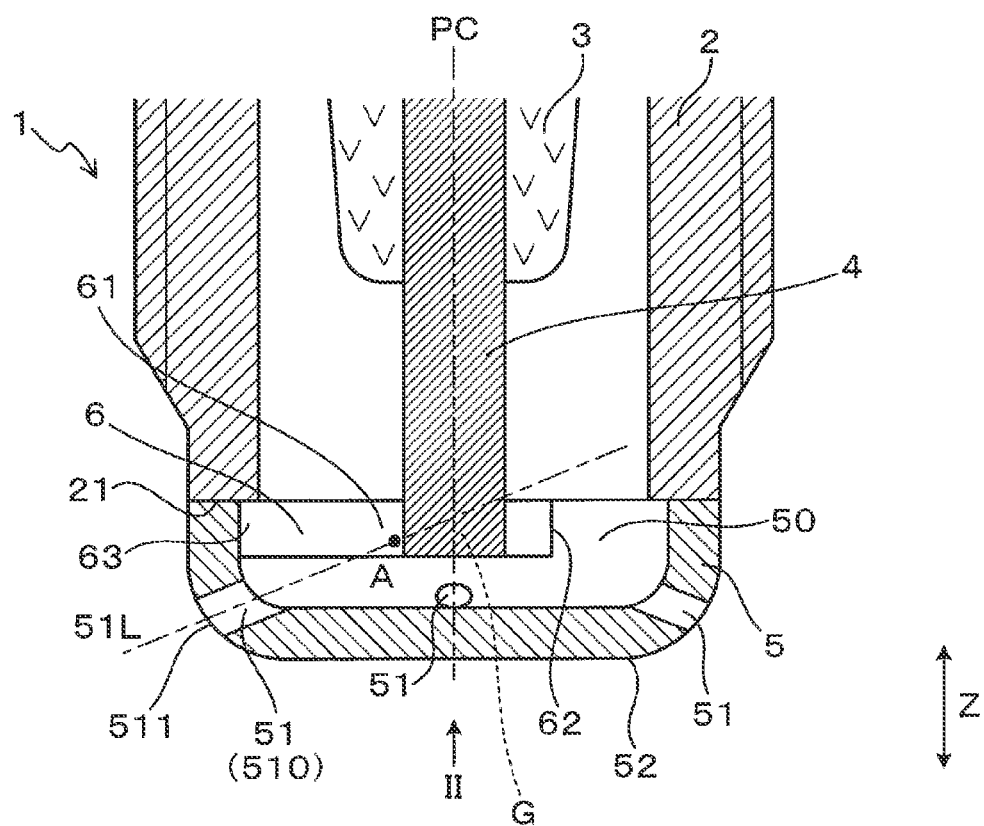
FIG. 1 is a cross-sectional view of a tip end of a spark plug according to the first embodiment, the cross-sectional view being taken along an axial direction of the spark plug and along line I-I of FIG. 2.
Figure 2:
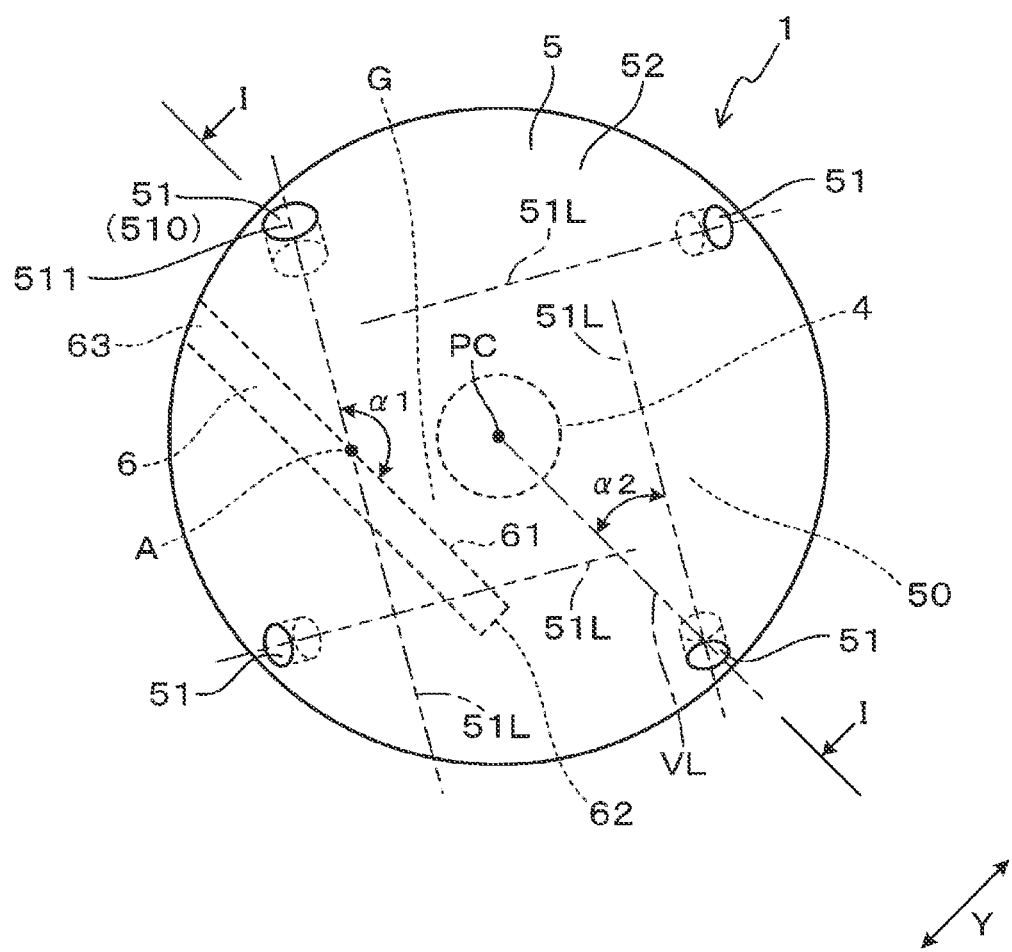
FIG. 2 is a view of the spark plug illustrated in FIG. 1 as viewed from an arrow II in FIG. 1.

The spark plug 1 is, as illustrated in FIGS. 1 and 2, comprised of a tubular cylindrical insulator 3, a center electrode 4, a tubular cylindrical housing 2, a ground electrode 6, and a plug cover 5.

The spark plug 1 has an axial direction Z extending along a center axis PC thereof, and has opposing first and second ends in the axial direction Z. The first end of the spark plug 1 serves as a tip end that exposes in a main chamber 11 of the engine 10 described later, and the second end of the spark plug 1 serves as a base end. In the spark plug 1, the axial direction Z has opposing first and second sides. The first side of the axial direction Z, which extends toward the tip end of the spark plug 1, will be referred to as a tip side, and the second side of the axial direction Z, which extends toward the base end of the spark plug 1, which will be referred to as a base side.

The insulator 3 has an inner peripheral surface, and the center electrode 4, which has a tip-side end, is disposed in an inner space of the insulator 3 with the tip-side end of the center electrode 4 protruding outwardly from the tip-side end of the insulator 3.

The housing 2 retains the insulator 3 thereinside. The ground electrode 6 is arranged to create a discharge gap G between the ground electrode 6 and the tip-side end of the center electrode 4.

The plug cover 5 is mounted onto the edge of the tip-side end of the housing 2 to define a sub-chamber 50 between the plug cover 5 and the tip-side end of the housing 2; the discharge gap G is located in the sub-chamber 50.

The ground electrode 6 has a substantially square pole shape, and has a stationary end 63 and a projection-end edge 62 opposite to the stationary end 63 in its longitudinal direction thereof. The stationary end 63 of the ground electrode 6 is mounted onto the tip-side end of the housing 2, and the projection-end edge 62 of the ground electrode 6 projects to be located in the sub-chamber 50 such that one side 61 of the ground electrode 6 faces the outer peripheral surface of the tip-side end of the center electrode 4, resulting in the discharge gap G being formed between the one side 61 of the ground electrode 6 and the outer peripheral surface of the tip-side end of the center electrode 4. The one side 61 of the square-pole shaped ground electrode 6, which faces the tip-side end of the center electrode 4, will be referred to as a facing side 61.

The plug cover 5 has formed therethrough plural injection holes 51 that enable the sub-chamber 50 to communicate with the outside thereof.

Each of the injection holes 51 has a center axis, and the center axis of each of the injection holes 51 is, as illustrated in FIG. 2, inclined with respect to a radial direction of the spark plug 1 passing through the corresponding one of the injection holes 51 as viewed in the axial direction Z of the spark plug 1.

At least one injection hole 51 of the injection holes 51 serves as a ground-directed injection hole 510 arranged to face the facing side 61 of the ground electrode 6, and an extension line 51L of the center axis of the at least one ground-directed injection hole 510 intersects with the facing side 61 of the ground electrode 6. A point at which the facing side 61 and the extension line 51L of the center axis of the ground-directed injection hole 510 intersect each other will be referred to as an intersection point A.

That is, the facing side 61 intersects the extension line 51L of the center axis of the ground-directed injection hole 510 at an angle $\alpha 1$ as viewed in the axial direction Z of the spark plug 1.

More specifically, the facing side 61 of the ground electrode 61 has a closer region closer to the projection-end edge 62 of the ground electrode 6 than the intersection point A is, and a farther region farther away from the projection-end edge 62 of the ground electrode 6 than the intersection point A is.

The angle $\alpha 1$ represents an angle made by the closer region of the facing side 61 and the extension line 51L of the center axis of the ground-directed injection hole 510 as viewed in the axial direction Z of the spark plug 1. The angle $\alpha 1$ is an obtuse angle.

The spark plug 1 according to the first embodiment can be used as firing means of an internal combustion engine for vehicles or cogeneration systems.

The following describes how to mount the spark plug 1 to the engine 10; the engine 10 is comprised of a cylinder head 76 that has a plug hole 761 formed therein.

Specifically, the housing 2 has an external thread 23 formed on the outer peripheral surface thereof, and the plug hole 761 has an internal thread formed on the inner peripheral surface of the plug hole 761. Meshing the external thread 23 of the spark plug 1 with the internal thread of the plug hole 761 causes the spark plug 1 to be mounted to the engine 10 with the first end of the spark plug 1 exposing in the main chamber 11 of the engine 10. The axial direction Z of the spark plug 10 can also be referred to as a plug axial direction Z. In FIG. 2, a direction in which the facing side 61 of the square-pole shaped ground electrode 6 is aligned to face the tip-side end of the center electrode 4 will also be referred to as a facing direction Y or a Y direction.

The plug cover 5 is, as illustrated in FIG. 1, joined to the tip-side end of the housing 2 by, for example, welding. With the spark plug 1 mounted to the engine 10, the plug cover 5 is arranged to define the sub-chamber 50 thereinside to thereby separate the sub-chamber 50 from the main chamber 11 of the engine 10.

Referring to FIGS. 1 and 2, each of the injection holes 51 formed through the plug cover 5 has an inner diameter, and the inner diameter of the ground-directed injection hole 510 is greater than the inner diameter of each of the other injection holes 51. The inner-diameter of the ground-directed injection hole 510 is, for example, 1.2 to 1.4 times more than the inner diameter of each of the other injection holes 51.

Each injection hole 51 extends obliquely outwardly toward the tip side of the axial direction Z.

During, for example, a compression stroke of the engine 10, each of the injection holes 51 permits an airflow to be introduced from the main chamber 11 into the sub-chamber 50. In particular, each of the injection holes 51 is configured such that the airflow introduced through the corresponding injection hole 51 in the sub-chamber 50 causes a swirl airflow or swirl flow, (see dashed arrow AF2 in FIG. 6) in the sub-chamber 50.

Specifically, each injection hole 51 is, as illustrated in FIG. 2, configured such that the extension line 51L of the center axis of the corresponding injection hole 51 extends while bypassing the plug center axis PC as viewed in the axial direction Z. For example, the extension line 51L of the center axis of each injection hole 51 extends while not passing through the center electrode 4. The plug center axis PC, which is the center axis of the spark plug 1, commonly serves as the center axis of the center electrode 4.

As viewed in the axial direction Z, the extension line 51L of the center axis of each injection hole 51 is inclined by an acute angle $\alpha 2$ with respect to a virtual line VL that is defined to extend in a radial direction of the spark plug 1 while passing through the plug center axis PC and any injection hole 51. A radial direction of the spark plug 1 will also be referred to as a plug radial direction.

In particular, the extension line 51L of the center axis of each injection hole 51 is inclined toward the same side in the circumferential direction of the spark plug 1 around the plug center axis PC, which will also be referred to as a plug circumferential direction. The acute angle $\alpha 2$ made between the extension line 51L of the center axis of each injection hole 51 and the corresponding virtual line VL is set to a constant acute angle.

Figure 6:
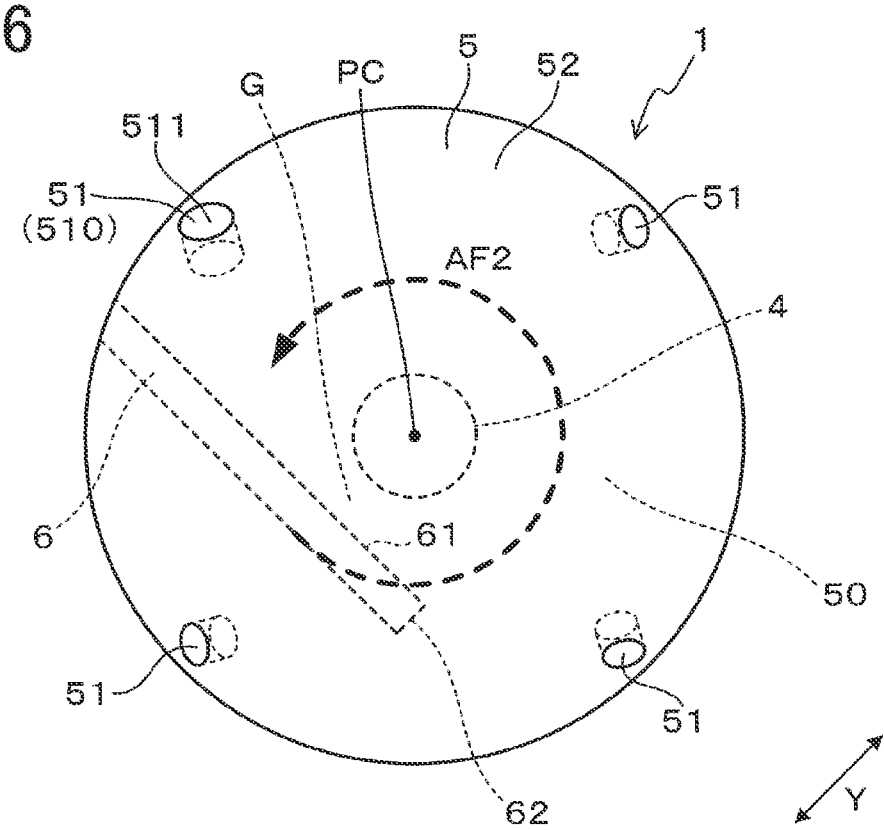
FIG. 6 is a view of the spark plug of the first embodiment as viewed from a tip-end side thereof, which shows the direction of a swirl flow formed in a sub-chamber during a compression stroke.

The configuration and arrangement of each injection hole 51 enables, as illustrated in FIG. 6, the airflow introduced in the sub-chamber 50 through the corresponding injection hole 51 to cause the swirl flow in the sub-chamber 50. The swirl flow in the sub-chamber 50 is, for example, produced to helically move in a counterclockwise direction as illustrated in FIG. 6.

The at least one ground-directed injection hole 510 formed through the plug cover 5 according to the first embodiment is arranged to face the facing side 61 of the ground electrode 6. Specifically, the outer opening 511 of the ground-directed injection hole 510 has an opening center axis, and the facing side 61 of the ground electrode 6 is an extension of the opening center axis of the ground-directed injection hole 510.

The angle $\alpha 1$ at which the facing side 61 intersects with the extension line 51L of the center axis of the ground-directed injection hole 510 can be set to be more than or equal to 120° as viewed in the axial direction Z.

The extension line 51L of the center axis of the ground-directed injection hole 510 passes, as illustrated in FIG. 1, through the discharge gap G as viewed in the Y direction. The discharge gap G, which is created between the ground electrode 6 and the tip-side end of the center electrode 4, is arranged to be closer to the plug cover 5 than the tip-side end of the housing 2 is.

Each of the facing side 61 and the outer peripheral surface of the tip-side end of the center electrode 4, which create the discharge gap G therebetween, can be formed by a chip. Such a chip can be made of noble metal, such as iridium or platinum, or made of alloy of iridium and platinum as its principal component.

The facing side 61 has a flat region in which the intersection point A is located.

As described above, the ground electrode 6 according to the first embodiment has a substantially square pole shape, so that the ground electrode 6 has four flat sides, one of which serves as the facing side 61. The facing side 61 faces the outer peripheral surface of the center electrode 4.

The facing side 61 according to the first embodiment extends to be perpendicular to the Y direction, and the whole of the facing side 61 is flat.

The housing 2 has a surface 21 of the tip-side end thereof, which will also be referred to as a tip-end surface 21. The stationary end 63 of the ground electrode 6 according to the first embodiment is joined to the tip-end surface 21 of the housing 2. The ground electrode 6 extends from the stationary end 63 mounted onto the tip end surface 21 in a direction perpendicular to the axial direction Z, and is arranged in the sub-chamber 50. The ground electrode 6 has, as illustrated in FIGS. 1 and 2, a first width in the Y direction and a second width in the axial direction Z, and the second width in the axial direction Z is greater than the first width in the facing direction Y.

The stationary end 63 of the ground electrode 6 is arranged on the opposite side of the center electrode 4 from the projection-end edge 62 of the ground electrode 6 as viewed in the facing direction Y.

The projection-end edge 62 of the ground electrode 6 is, as illustrated in FIG. 1, arranged on the opposite side of the center electrode 4 from the intersection point A.

The facing side 61 of the ground electrode 6 has a middle in the axial direction Z, and the intersection point A according to the first embodiment is located to be clear to the tip-side end of the center electrode 4 than the middle of the facing side 61 of the ground electrode 6 is in the axial direction Z. Additionally, as viewed in the Y direction, the intersection point A is located to be closer to the stationary end 63 of the ground electrode 6 than the center electrode 4 is.

As viewed in the Y direction, the length of the shortest distance between the intersection point A and the center electrode 4 is set to be smaller than the diameter of the center electrode 4. As viewed in the Y direction, the intersection point A can be set to overlap with the center electrode 4 at least partially, or can be located to be closer to the projection-end edge 62 of the ground electrode 6 than the center electrode 4 is.

Next, the following describes a method of manufacturing the spark plug 1 according to the first embodiment.

Figure 3:
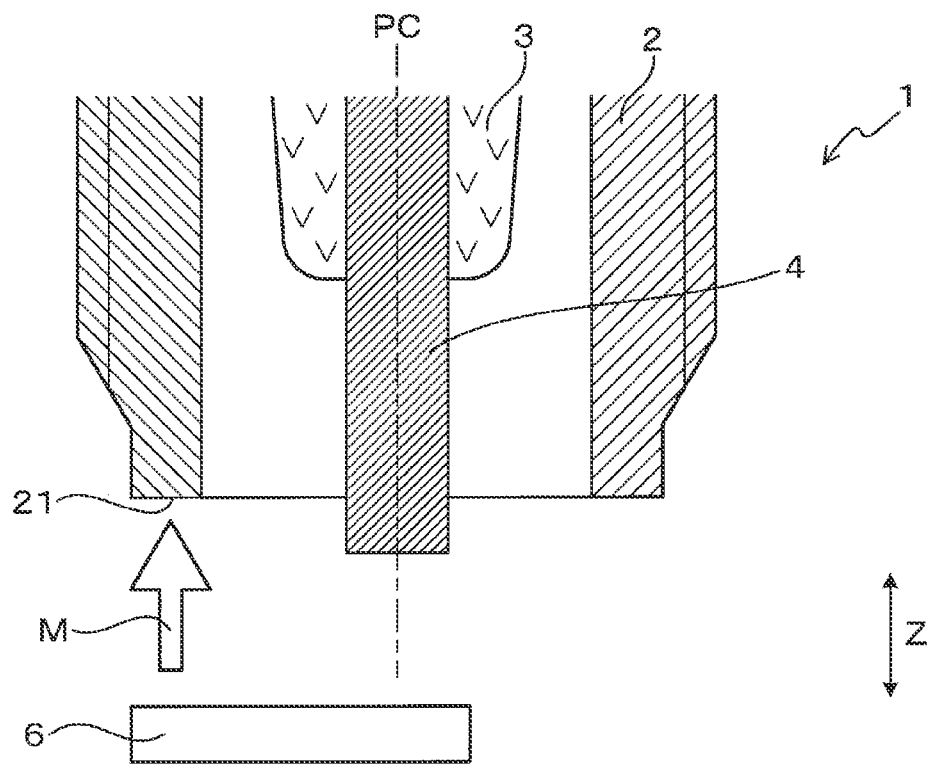
FIG. 3 is a cross-sectional view of the spark plug according to the first embodiment, which illustrates a method of mounting a ground electrode to a housing.

First, the method includes a first step of joining, as illustrated in FIG. 3, the ground electrode 6 to the tip-end surface 21 of the housing 2 to which the center electrode 4 and the insulator 3 have been mounted. Specifically, the first step moves the ground electrode 6, which has a substantially square pole shape, in a direction indicated by arrow M in FIG. 3 to thereby arrange one flat side of the ground electrode 6 to abut onto the flat tip-end surface 21 of the housing 2, and thereafter joins the one flat side of the ground electrode 6 to the tip-end surface 21 of the housing 2 by, for example, welding.

After the ground electrode 6 joined to the housing 2, the first step slightly deforms the ground electrode 6 to thereby adjust the length of the discharge gap G to a predetermined proper length.

The first step can join the ground electrode 6 to the housing 2 before mounting of the center electrode 4 and the insulator 3 to the housing 2, and thereafter mount the center electrode 4 and the insulator 3 to the housing 2 to which the ground electrode 6 has been joined.

Figure 4:
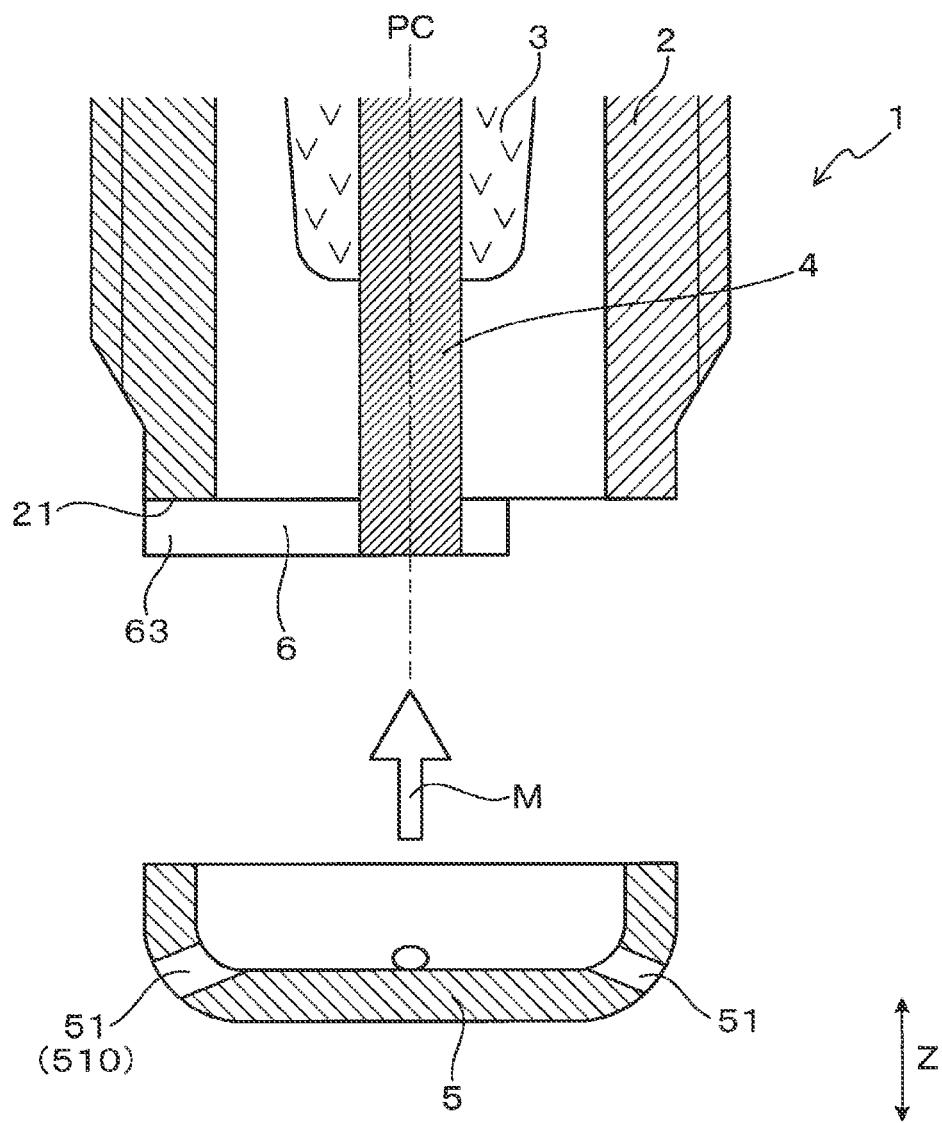
FIG. 4 is a cross-sectional view of the spark plug according to the first embodiment, which illustrates how to mount a plug cover to the housing.

Next, the method includes a second step of moving, as illustrated in FIG. 4, the plug cover 5, which has a flat bottom, in a direction indicated by arrow M in FIG. 4 to thereby arrange the flat bottom of the plug cover 5 to abut onto the tip-end surface 21 of the housing 2, and thereafter joins the flat bottom of the plug cover 5 to the tip-end surface 21 of the housing 2 by, for example, welding.

For example, the bottom of the plug cover 5 according to the first embodiment has formed therein an unillustrated concave recess toward the ground electrode 4; the concave recess is shaped to be in conformity with the shape and arrangement of the ground electrode 6. Then, the second step arranges the plug cover 5 such that the ground electrode 6 is fit in the concave recess of the plug cover 5, and thereafter, joins the housing 2 and the plug cover 5 to each other described above. This makes it possible to manufacture, as illustrated in FIGS. 1 and 2, the spark plug 1 according to the first embodiment.

Figure 5:
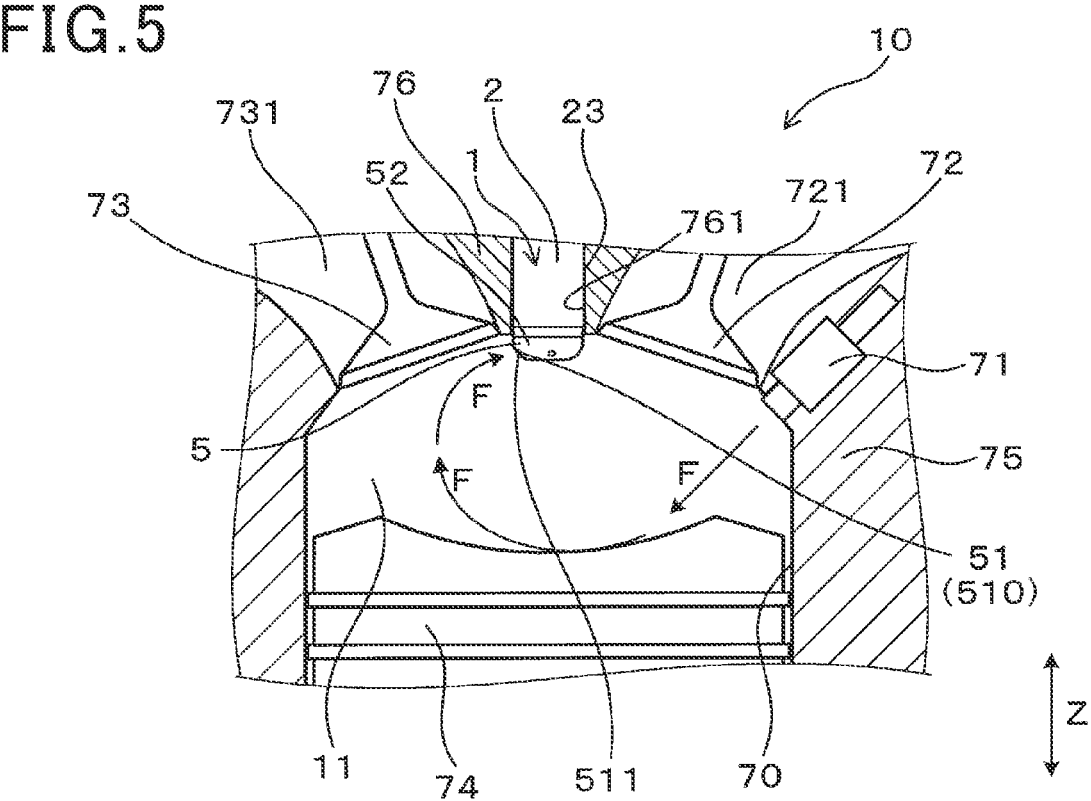
FIG. 5 is a cross-sectional view of an internal combustion engine according to the first embodiment.

FIG. 5 illustrates the engine 10 equipped with the spark plug 1.

The engine 10 includes the main chamber 11, the spark plug 1, and an injector 71. The spark plug 1 is arranged such that an outer peripheral surface 52 of the plug cover 5 is exposed in the main chamber 11. The injector 7 is configured to directly spray fuel into the main chamber 11.

Figure 7:
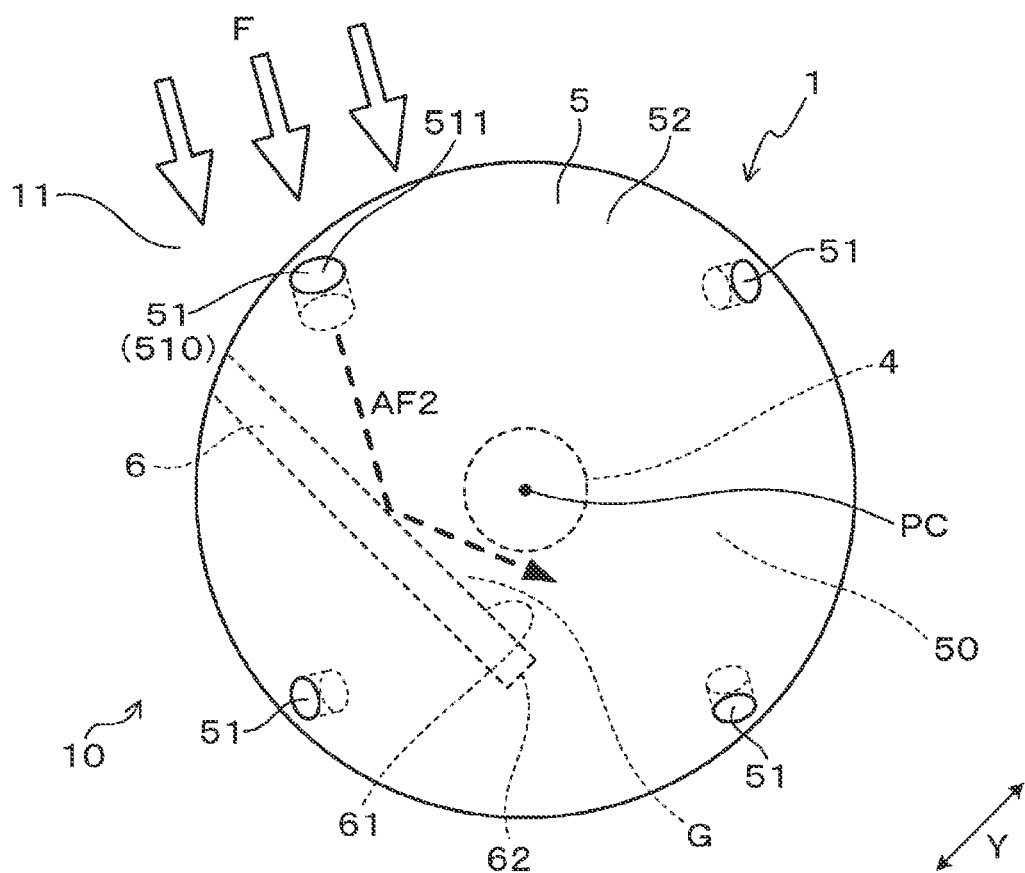
FIG. 7 is a view of the spark plug of the first embodiment as viewed from the tip-end side thereof, which shows the direction of a fuel-containing flow with respect to the spark plug.

The spark plug 1 is, as illustrated in FIGS. 5 and 7, arranged such that a fuel-containing flow F including the fuel sprayed from the injector 71 during the compression stroke of the engine 10 is directed toward an outer opening 511 of the ground-directed injection hole 510. The direction of the fuel-containing flow F, which is an arrow illustrated in each of FIGS. 5 and 7, represents the direction of the fuel flow immediately after the spraying of fuel into the main chamber 11, so that the direction of the fuel-containing flow F is not necessarily agreement with the direction of a stream in the main chamber 11 during the compression stroke or an expansion stroke.

Adjustment of the direction of the fuel-containing flow F toward the opening 511 of the ground-directed injection hole 510 enables the outer opening 511 of the ground-directed injection hole 510 to be viewed from the direction of the fuel-containing flow F.

The engine 10 according to the first embodiment also includes, as illustrated in FIG. 5, the cylinder head 76 described above, and a cylinder block 75, which has defined therein a cylinder 70. The engine 10 also includes a piston 74, which has opposing tip-side end and base-side end, disposed in the cylinder 70 to be reciprocable in the cylinder 70. The cylinder head 76, the cylinder block 75, and the piston 74 define a space surrounded thereby; the space constitutes the main chamber 11.

The cylinder head 76 has formed therethrough an intake port 721 and an exhaust port 731. An intake valve 72 is provided in the intake port 721, and an exhaust valve 73 is provided in the exhaust port 731. The spark plug 1 is located between the intake port 721 and the exhaust port 731 in the cylinder head 76. In particular, the spark plug 1 according to the first embodiment is arranged such that the outer opening 511 of the ground-directed injection hole 510 is oriented toward the exhaust pipe 73.

Each of the intake port 721 and the exhaust port 731 has an opening center axis, and the opening center axis of each of the intake port 721 and the exhaust port 731 is inclined with respect to the reciprocal direction of the piston 74 while being oriented toward a center axis of the main chamber 11. A base-end surface of the main chamber 11 extending around the spark plug 1 is reverse-tapered from the spark plug 1 toward the tip-side end of the cylinder 70.

The injector 71, which has been formed in the cylinder block 76, is located adjacent to the intake port 721. Specifically, the injector 71 has been formed in the cylinder block 76 while having a ready to spray fuel toward the center axis of the main chamber 11.

An intake stroke, the compression stroke, the expansion stroke, and an exhaust stroke are repeated based on up or down motion of the piston 74 in the engine 10.

Specifically, during the intake stroke, gas, whose main component is air, is introduced from the intake port 721 into the main chamber 11. During the exhaust stroke, gas in the main chamber 11 is exhausted from the exhaust port 731. The introduction of the gas into the main chamber 11 during the intake stroke for example causes a predetermined airflow to be formed in the main chamber 11, and this airflow remains in the main chamber 11 during the compression stroke.

During the compression stroke, an atmosphere in the main chamber 11 is compressed, so that an airflow flows into the sub-chamber 50 via each injection hole 51. The airflows introduced through the injection holes 51 in the sub-chamber 50 cause the swirl flow in the sub-chamber 50, and increases a pressure in the sub-chamber 50. For example, during the compression stroke, the injector 71 directly sprays fuel into the main chamber 11.

The fuel sprayed in the main chamber 11 causes, as illustrated in FIG. 5, a fuel-containing flow F together with air in the main chamber 11, and the fuel-containing flow F hits on a concave surface of the base-side end of the piston 74. The fuel-containing flow F hit onto the concave surface of the base-side end of the piston 74 changes its direction toward the base-end side of the spark plug 1, i.e., toward the spark plug 1. The fuel-containing flow F has, as illustrate in FIG. 7, reached the outer opening 511 of the of the ground-directed injection hole 510 or thereabout.

Because the fuel-containing flow F is an air-fuel mixture whose fuel percent is relatively high, the air-fuel mixture whose fuel percent is relatively high has reached the outer opening 511 of the of the ground-directed injection hole 510 or thereabout. At that time, the ground-directed injection hole 510 causes the air-fuel mixture to be drawn as an airflow AF2 into the sub-chamber 50 in which the swirl flow illustrated in FIG. 6 has been created.

As illustrated in FIG. 7, the airflow AF2 based on the air-fuel mixture whose fuel density is relatively high together with the swirl flow is guided by the facing side 61 of the ground electrode 6, thus the airflow AF2 based on the air-fuel mixture moving toward the discharge gap G.

When the piston 74 has moved to the top dead center or thereabout, a spark is generated in the discharge gap G of the spark plug 1, making it possible to efficiently fire the air-fuel mixture. The above timing of spraying fuel into the main chamber 11 and the above timing of generating a spark in the discharge gap G can be freely changed in consideration of the operating modes of the engine 10 and/or various purposes.

Figure 8:
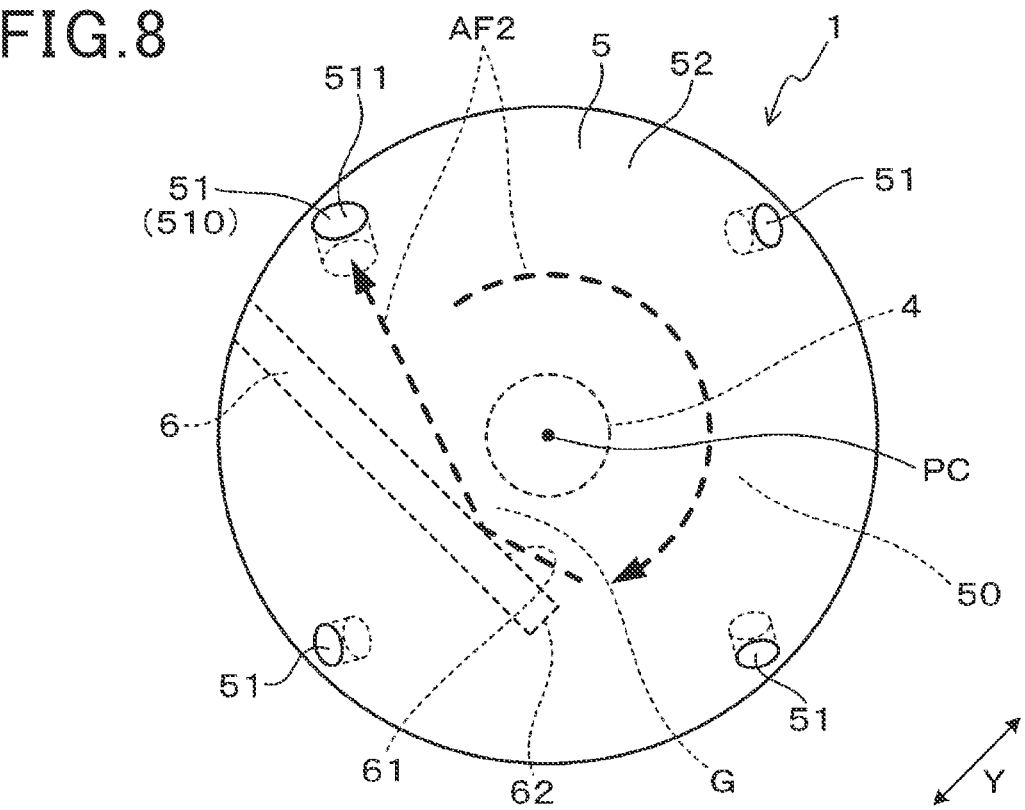
FIG. 8 is a view of the spark plug of the first embodiment as viewed from the tip-end side thereof, which shows the direction of an airflow flowing out of the sub-chamber through a ground-directed injection hole during an expansion stroke.

During the expansion stroke, the ignition of the air-fuel mixture forces the piston to move down toward the tip-end side, resulting in a negative pressure in the main chamber 11 with respect to the pressure in the sub-chamber 50. The negative pressure in the main chamber 11 with respect to the pressure in the sub-chamber 50 causes an airflow in the sub-chamber 50 to flow through each injection hole 51 into the main chamber 11. This results in, as illustrated in FIG. 8, a new airflow (see the same reference character AF2 in FIG. 8) being formed; the airflow AF2 is guided by the facing side 61 of the ground electrode 6, and flows through the discharge gap G toward the ground-directed injection hole 510.

Next, the following describes how the spark plug 1 and the engine 10 equipped with the spark plug 1 work.

The center axis of each of the injection holes 51 is inclined with respect to a radial direction of the spark plug 1 passing through the corresponding one of the injection holes 51 as viewed in the axial direction Z of the spark plug 1. This enables an airflow introduced into the sub-chamber 50 through each injection hole 51 or an airflow flowing out from the sub-chamber 50 through each injection hole 51 to produce a swirl flow in the sub-chamber 50.

The angle α1 at which the closer region of the facing side 61 intersects with the extension line 51L of the center axis of the ground-directed injection hole 510 is an obtuse angle as viewed in the axial direction Z of the spark plug 1. The airflow AF2 guided by the facing side 61 into the sub-chamber 50 therefore enables a spark generated in the discharge gap G to extend more easily, making it possible to improve the ignitability of the spark plug 1.

Let us assume that the engine 10 is configured to generate a spark in the discharge gap G during the expansion stroke. In this assumption, the airflow AF2 flowing out from the sub-chamber 50 through the ground-directed injection hole 510 enables a spark generated in the discharge gap G to extend more easily, making it possible to improve the ignitability in the sub-chamber 50.

This expansion of the spark enables the firing position of the air-fuel mixture to be easily closer to the ground-directed injection hole 510. This therefore makes it possible to, even if the engine 10 is operating under a low temperature condition of the sub-chamber 50, reduce a cooling loss of the spark, thus increasing the strength of a flame jet issuing into the main chamber 11.

The spark plug 1 according to the first embodiment enables a spark or discharge plasma or initial flame generated in the discharge gap G to issue more easily from the ground-directed injection hole 510 into the main chamber 11, making it possible to improve the ignitability in the main chamber 11.

If the angle α1 made by the closer region of the facing side 61 and the extension line 51L of the center axis of the ground-directed injection hole 510 were an acute angle, an airflow introduced into the sub-chamber 50 through each ignition hole 51 during the compression stroke of the engine 10 would be guided by the facing side 61 toward a direction opposite to the direction toward the discharge gap G. For this reason, a spark generated in the discharge gap G during the compression stroke would be less likely to extend. Additionally, during the expansion stoke of the engine 10, a stream guided by the facing side 10 would be less likely to be directed toward the ground-directed injection hole 510, resulting in the spark generated in the discharge gap G being less likely to extend.

In contrast, as described above, the angle α1 at which the closer region of the facing side 61 intersects with the extension line 51L of the center axis of the ground-directed injection hole 510 is an obtuse angle according to the first embodiment.

This enables the airflow AF2 introduced into the sub-chamber 50 through the ground-directed injection hole 510 during the compression stroke of the engine 10 to be guided more easily as the swirl flow by the facing side 61 toward the discharge gap G. The airflow AF2 guided by the facing side 61 toward the discharge gap G therefore enables a spark generated in the discharge gap G to extend more easily.

As described above, the engine 10 can be configured to generate a spark in the discharge gap G of the spark plug 1 during the expansion stroke in a case where the engine 10 starts to operate in, for example, a catalyst warm-up mode.

In this case, the spark plug 1 according to the first embodiment enables the airflow AF2 to more easily guided toward the ground-directed injection hole 510, resulting in the airflow AF2 passing through the discharge gap G. This enables a spark generated in the discharge gap G to be extend more easily, making it possible to improve the ignitability in the sub-chamber 50 in a case where the engine 10 generates a spark in the discharge gap G of the spark plug 1 during the expansion stroke.

The facing side 61 and the extension line 51L of the center axis of the ground-directed injection hole 510 intersect each other at the intersection point A. This enables the airflow AF2 introduced into the sub-chamber 50 from the ground-directed injection hole 510 to be more easily guided by the facing side 61. This results in the airflow AF2 guided by the facing side 61 being directed toward the discharge gap G, enabling a spark to extend more easily.

An initial frame formed based on the spark generated in the discharge gap G is transported by the swirl flow toward the base-end side of the sub-chamber 50. This enables the initial flame to grow from the base-end side or middle of the sub-chamber 50. This increases the pressure in the sub-chamber 50 at the timing when the expanded flame has reached each injection hole 51, making it possible to increase the strength of the flame jet issuing into the main chamber 11.

The facing side 61 has a flat region in which the intersection point A is located. This enables the airflow AF2 in the sub-chamber 50 to be more easily guided by the facing side 61. This increases the degree of expansion of a spark generated in the discharge gap G.

The projection-end edge 62 of the ground electrode 6 is arranged on the opposite side of the center electrode 4 from the intersection point A as viewed in the facing direction Y between the center electrode 4 and the ground electrode 6. This enables the airflow AF2 in the sub-chamber 50 to be more easily guided by the facing side 61 during the expansion stroke of the engine 10, resulting in a spark generated in the discharge gap G extending more easily during the expansion stroke of the engine 10.

The inner diameter of the ground-directed injection hole 510 is greater than the inner diameter of each of the other injection holes 51. This enables the airflow AF2 introduced through the ground-directed injection hole 510 into the sub-chamber 50 or the airflow AF2 flowing out from the sub-chamber 50 through the ground-directed injection hole 510 to be more easily stronger, resulting in the airflow AF2 guided by the facing side 61 being more easily stronger. This therefore increases the degree of expansion of a spark generated in the discharge gap G.

The second width of the ground electrode 6 in the axial direction Z is greater than the first width in the facing direction Y. This enables the facing side 61 of the ground electrode 6 to guide the airflow AF2 in the sub-chamber 50 more efficiently and ensure a sufficient capability of dissipating heat from the ground electrode 6.

The spark plug 1 of the engine 10 is arranged such that a fuel-containing flow F including the fuel sprayed from the injector 71 is directed toward the outer opening 511 of the ground-directed injection hole 510. This enables the air-fuel mixture having a high fuel density to be more easily introduced from the ground-directed injection hole 510 into the sub chamber 50. This results in the air-fuel mixture with a high fuel density reaching more easily the discharge gap G, making it possible to improve the ignitability of the spark plug 1.

For example, while operating in a high-load operation mode, the engine 10 can perform retard injection or retard ignition for the purpose of reducing preignition events. The retard injection represents a specific fuel-injection timing later than a predetermined normal timing of fuel injection, and the retard ignition represents a specific ignition timing later than a predetermined normal ignition timing of generating a spark in the discharge gap G of the spark plug 1.

As an example, the fuel-injection timing from the injector 71 as the retard injection is set to a time immediately before the piston 74 has reached the TDC during the compression stroke. Specifically, the injector 71 of this example is controlled to spray fuel when the piston 74 has reached, for example, 30° CA BTDC. The X° CA BTDC represents crank angle degrees of the engine 10 before the TDC. Additionally, the timing of generating a spark in the discharge gap G of the spark plug 1 as the retard ignition is substantially set to the TDC.

The retard injection and the retard ignition described above reduces the probability of earlier timing of firing of the air-fuel mixture, i.e., earlier firing of the air-fuel mixture, thus reducing preignition events. At the timing of starting the retard injection to thereby spray fuel into the main chamber 11, a certain volume of air has been filed in the sub-chamber 50, so that the strength of a stream in the main chamber 11 has become weak. For this reason, there is a situation where the quantity of fuel to be introduced from each injection hole 51 into the sub-chamber 51 is relatively small.

From this viewpoint, the spark plug 1 according to the first embodiment includes the above ground-directed injection hole 510, and has the obtuse angle α1 made by the closer region of the facing side 61 and the extension line 51L of the center axis of the ground-directed injection hole 510. This therefore enables the air-fuel mixture having a high fuel density to be more easily introduced from the ground-directed injection hole 510 into the sub chamber 50. This results in the air-fuel mixture with a high fuel density reaching more easily the discharge gap G. Accordingly, this feature increases, even if the quantity of fuel to be introduced from each injection hole 51 into the sub-chamber 51 is relatively small, the percentage of fuel being supplied to the discharge gap G, making it possible to improve the ignitability in the sub-chamber 50, and therefore improve the ignitability in the main chamber 11.

Even if the fuel injection is carried out during the expansion stroke of the engine 10, the spark plug 1 achieves an advantageous benefit of enabling a spark generated in the discharge gap G to extend more easily, which is the same as stated for the above case where the fuel injection is carried out during the compression stroke of the engine 10.

For example, the engine 10 operates in an exhaust gas recirculation mode, i.e., an EGR combustion mode, to thereby (i) spray fuel during the expansion stroke thereof, and (ii) generate a spark in the discharge gap G during the compression stroke thereof. In the EGR combustion mode of the engine 10, the spark plug 1 of the first embodiment enables a spark generated in the discharge gap G to extend more easily, making it possible to improve the ignitability of the spark plug 1. This improvement of the ignitability of the spark plug 1 improves an upper limit of the quantity of recirculated exhaust gas, making it possible to improve the fuel efficiency of the engine 10.

The ground electrode 6 of the spark plug 1 of the first embodiment is mounted onto the tip-side end of the housing 2 so that the length of the discharge gap G is adjusted, and the plug cover 5 is secured to the housing 2 after adjustment of the length of the discharge gap G. This makes it possible to more easily assemble the ground electrode 6 and the plug cover 5 to the housing 2, thus offering the spark plug 1 having an improved assembling efficiency.

As described above in detail, the first embodiment provides the spark plug 1 having improved ignitability and the engine 10 equipped with the spark plug 1.

Second Embodiment

Figure 9:
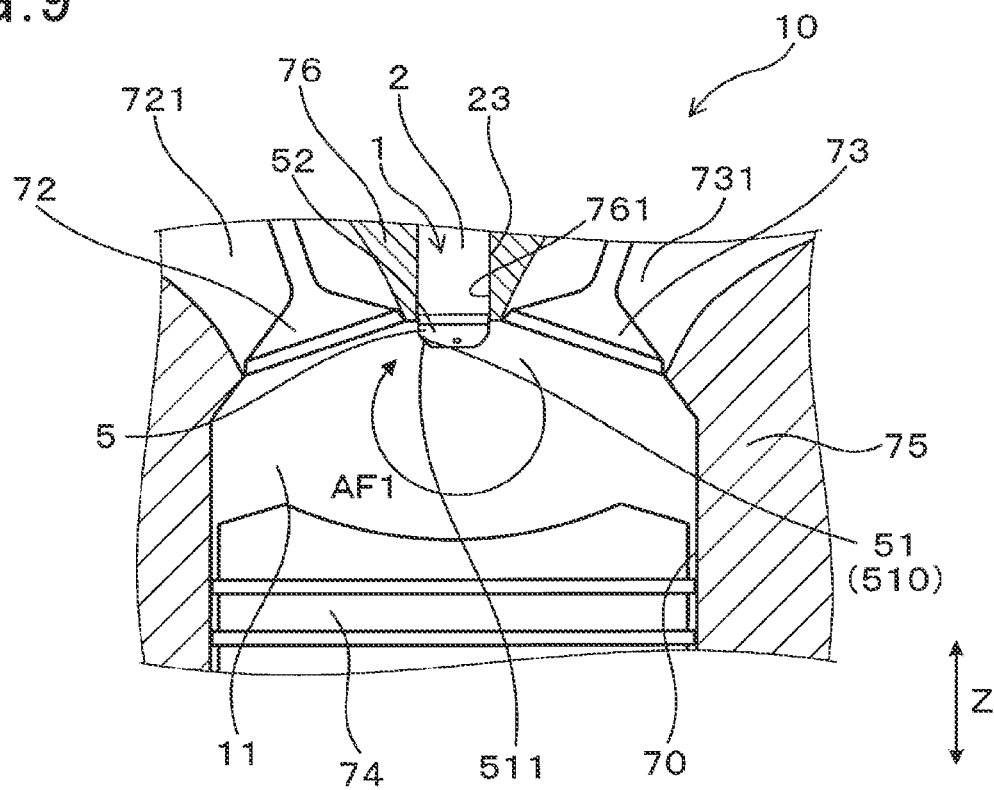
FIG. 9 is a cross-sectional view of an internal combustion engine according to the second embodiment.
Figure 10:
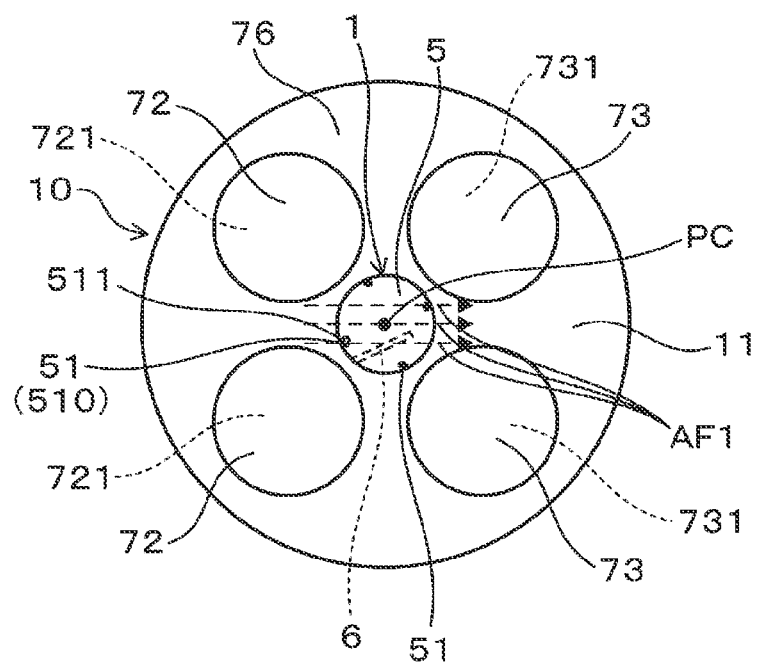
FIG. 10 is a view of a spark plug of the second embodiment as viewed from the tip-end side thereof, which shows the direction of an airflow formed in the main chamber.
Figure 11:
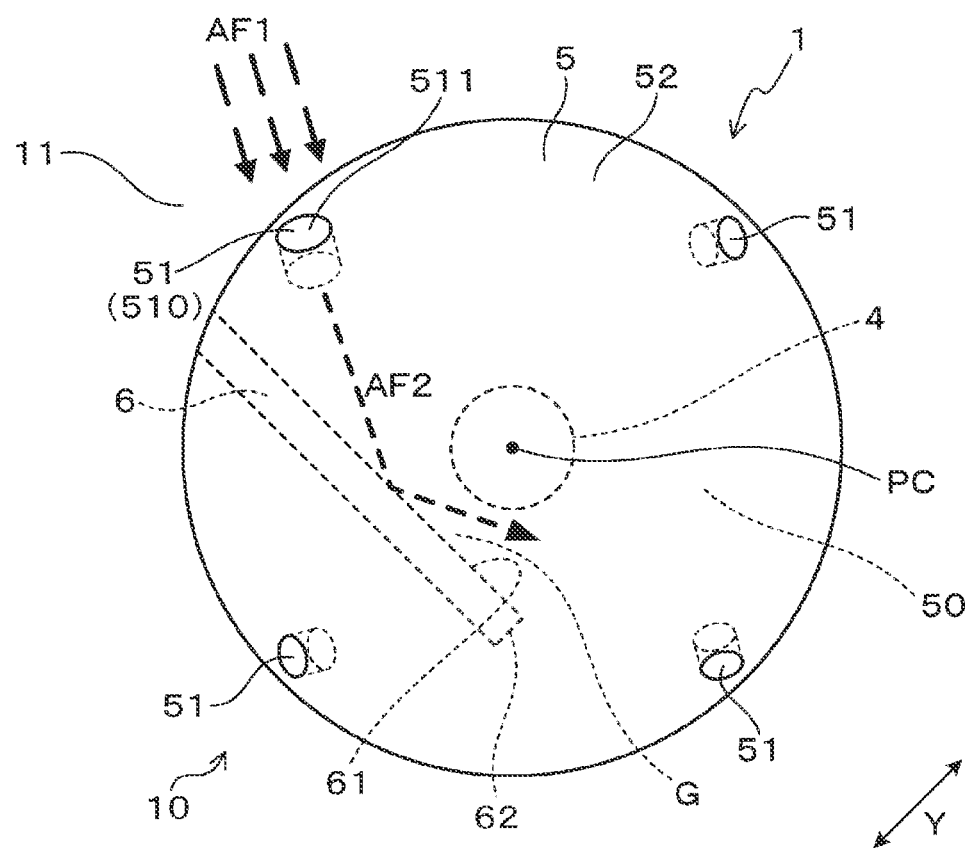
FIG. 11 is a view of the spark plug of the second embodiment as viewed from the tip-end side thereof, which shows the direction of an airflow with respect to the spark plug.

The following describes a second embodiment of the present disclosure with reference to FIGS. 9 to 11.

A spark plug 1 according to the second embodiment is formed in the cylinder head 76 and arranged to be surrounded by a pair of intake ports 721 formed through the cylinder head 76 and a pair of exhaust ports 731 formed through the cylinder head 76. Specifically, the spark plug 1 is arranged such that the outer opening 511 of the ground-directed injection hole 510 is directed toward an upstream side of an airflow (see arrow AF1 in FIG. 9) formed in the main chamber 11.

During the intake stroke, gas is introduced from each intake port 721 into the main chamber 11. During the exhaust stroke, gas in the main chamber 11 is exhausted from each exhaust port 731.

In the main chamber 11, as illustrated in FIG. 9, the airflow AF1 is formed; the airflow AF1 is a tumble flow of gas around an axis perpendicular to the reciprocal direction of the piston 74. When passing through the tip end of the spark plug 1 or thereabout, the airflow AF1 is directed from a pair of intake valves 72 installed in the pair of intake ports 721 toward a pair of exhaust valves 73 installed in the pair of exhaust ports 731. Specifically, as illustrated in FIG. 10, a main stream around the tip end of the spark plug 1 is the airflow AF1 directed from the middle of the pair of intake ports 721 to the middle of the exhaust ports 731 as viewed in the axial direction Z.

Note that the direction of the main stream formed in the main chamber 11 is not always a constant direction, and therefore can vary for example, between a different adjacent pair of the four strokes of the engine 10 or at different times during one of the four strokes of the engine 10. The direction of the main stream however at particular timing, i.e., at the ignition timing, is definitely set to a predetermined direction. The airflow AF1 represents the main stream formed in the main chamber 11 at the ignition timing. Unless otherwise noted, an airflow or a stream formed in the main chamber 11 according to the second embodiment means the airflow AF1 flowing through the tip end of the spark plug 1 or thereabout at the ignition timing.

Unillustrated injectors according to the second embodiment are each provided in the engine 10 to spray fuel into the corresponding one of the intake ports 721. Like the first embodiment, an injector can be provided in the engine 10 to directly spray fuel into the main chamber 11. The other components of the second embodiment are substantially identical to the corresponding components of the first embodiment. To each pair of identical or equivalent components described in all the embodiments, a corresponding unique reference character is assigned unless otherwise noted.

The spark plug 1 included in the engine 10 according to the second embodiment is arranged such that the outer opening 511 of the ground-directed injection hole 510 is directed toward the upstream side of the airflow AF1 formed in the main chamber 11. This enables an airflow AF2 to be more easily introduced as the airflow AF2 from the main chamber 11 to the sub-chamber 50 via the ground-directed injection hole 510. This enables the airflow AF2 to extend more easily a spark generated in the discharge gap G reliably, making it possible to improve the ignitability of the spark plug 1. The second embodiment additionally achieves the same advantageous benefits as stated for the first embodiment.

Third Embodiment

Figure 12:
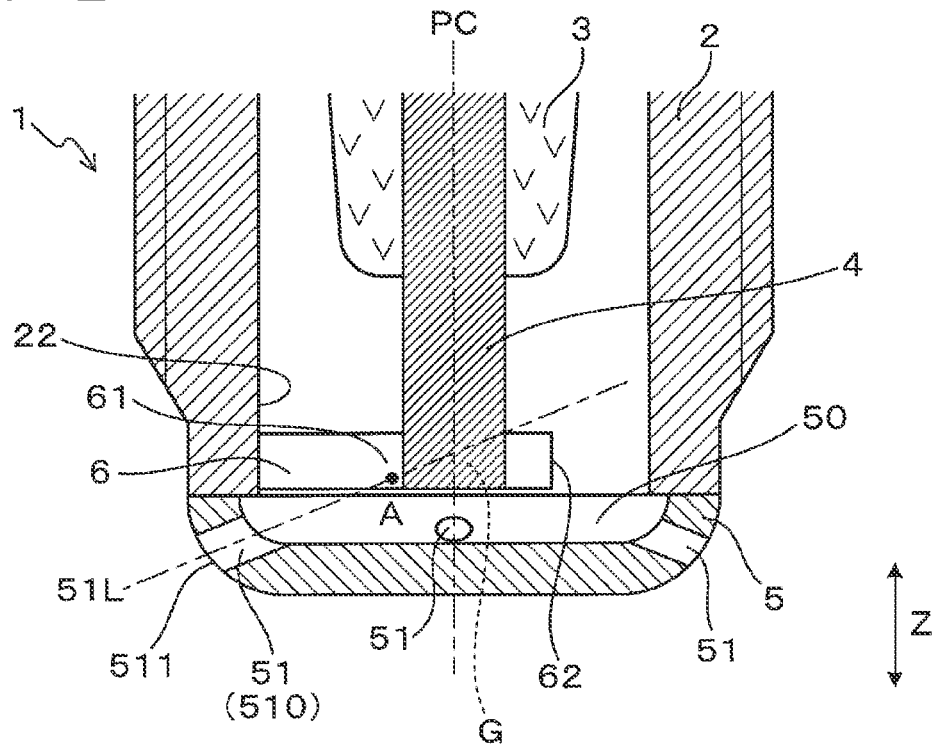
FIG. 12 is a cross-sectional view of the tip end of a spark plug according to the third embodiment, the cross-sectional view being taken along the axial direction of the spark plug.

The following describes a third embodiment of the present disclosure with reference to FIG. 12. The mount position of the ground electrode 6 according to the third embodiment is changed from that according to the first embodiment.

Specifically, the ground electrode 6 is, as illustrated in FIG. 12, mounted onto the inner peripheral surface of the tip-side end of the housing 2, so that the discharge gap G is located to be closer to the base end of the spark plug 1 than the tip end of the housing 2 is. The other components of the third embodiment are substantially identical to the corresponding components of the first embodiment.

The third embodiment achieves the same advantageous benefits as stated for the first embodiment.

Fourth Embodiment

Figure 13:
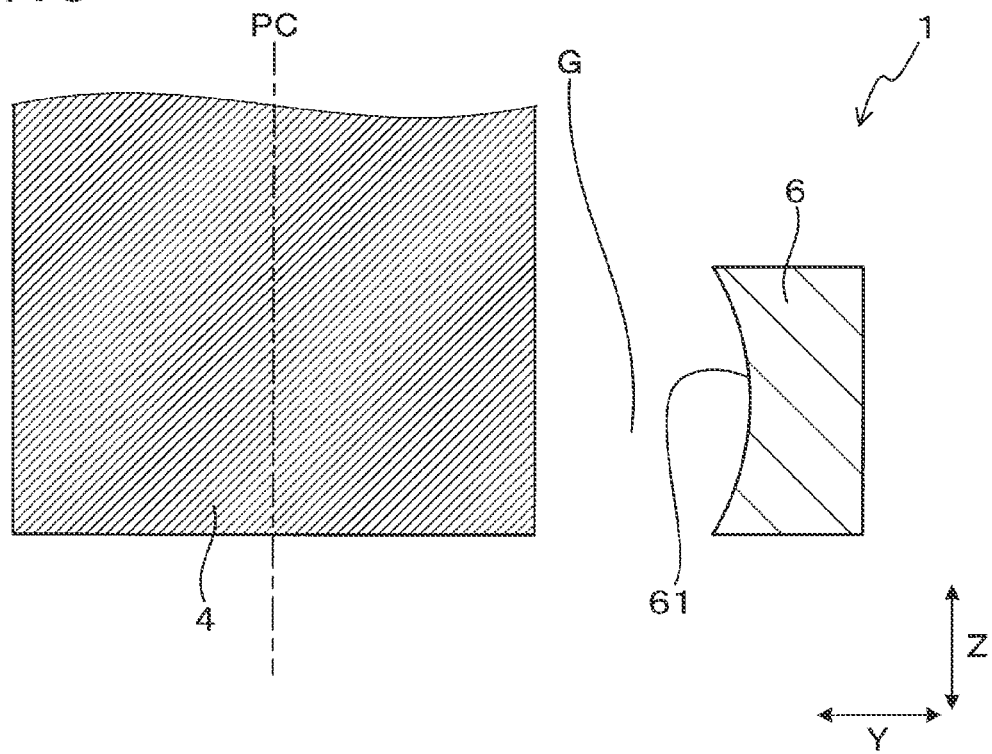
FIG. 13 is a cross-sectional view perpendicular to a projecting direction of the ground electrode around a discharge gap of the spark plug.

The following describes a fourth embodiment of the present disclosure with reference to FIG. 13. The facing side 61 of the ground electrode 6 is shaped as an inwardly concave shape. The intersection point A is located in the inwardly concave facing side 61 of the ground electrode 6.

Specifically, as illustrated in FIG. 13, the shape of a cross section of the facing side 61 has an inwardly concave shape toward one of the facing direction Y; the cross section is perpendicular to the projecting direction of the ground electrode 6, and includes the plug center axis PC. In other words, the farther any point on the inwardly concave surface of the facing side 61 from each of a base-side end and a tip-side end of the ground electrode 6, the farther from the center electrode 4 in the facing direction Y. That is, the center of the cross section of the inwardly concave surface of the facing side 61 in the axial direction Z is located to be the furthest from the center electrode 4 in any point on the cross section; the cross section is perpendicular to the projecting direction of the ground electrode 6, and includes the plug center axis PC. The position of the base-side end of the cross section of the inwardly concave surface of the facing side 61 in the facing direction Y is substantially identical to the position of the tip-side end of the cross section of the inwardly concave surface of the facing side 61 in the facing direction Y.

The fourth embodiment achieves the same advantageous benefits as stated for the first embodiment.

Fifth Embodiment

Figure 14:
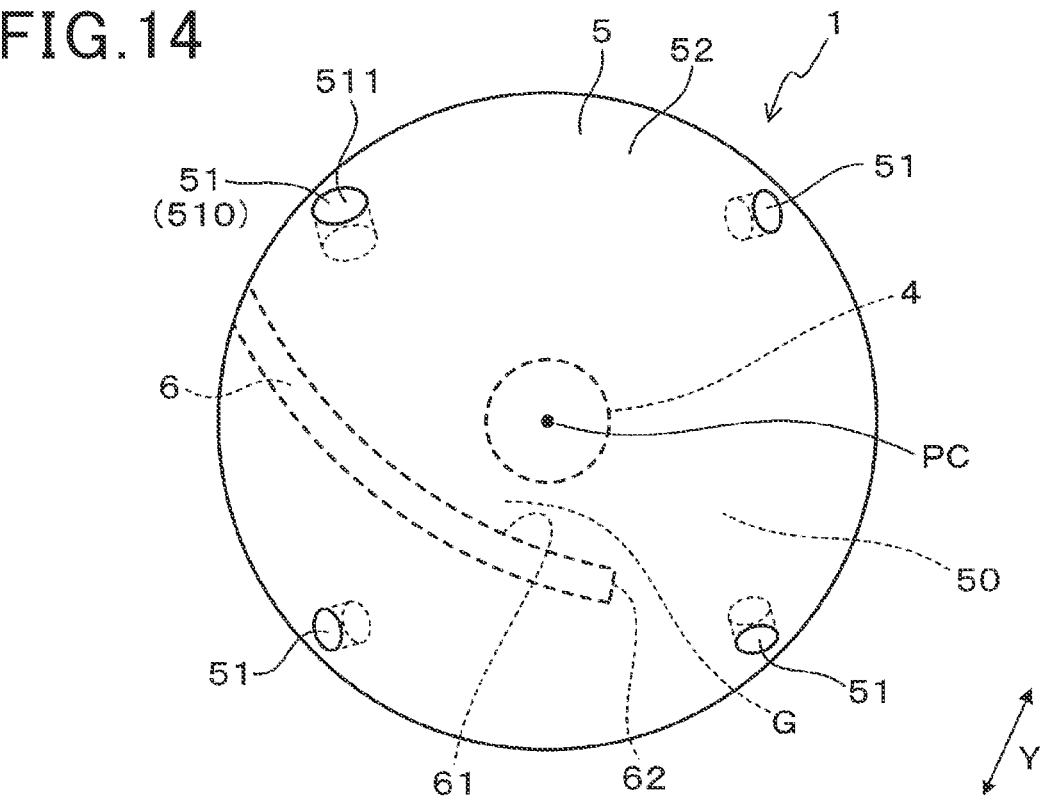
FIG. 14 is a plan view of a spark plug according to the fifth embodiment as viewed from the tip-end side thereof.

The following describes a fifth embodiment of the present disclosure with reference to FIG. 14. The configuration of the ground electrode 6 according to the fifth embodiment is changed from that of the ground electrode 6 according to the first embodiment.

That is, the ground electrode 6 according to the fifth embodiment has a substantially circular arc shape projecting away from the center electrode 4 as viewed in the axial direction Z. This results in the facing side 61 of the ground electrode 6 having a substantially circular arc shape projecting away from the center electrode 4 as viewed in the axial direction Z. The other components of the fifth embodiment are substantially identical to the corresponding components of the first embodiment.

The facing side 61 of the ground electrode 6 has a substantially circular arc shape projecting away from the center electrode 4 as viewed in the axial direction Z. This enables an airflow guided by the facing side 61 to be unlikely to weaken, resulting a spark generated in the discharge gap G further extending more easily.

The fifth embodiment additionally achieves the same advantageous benefits as stated for the first embodiment.

Sixth Embodiment

Figure 15:
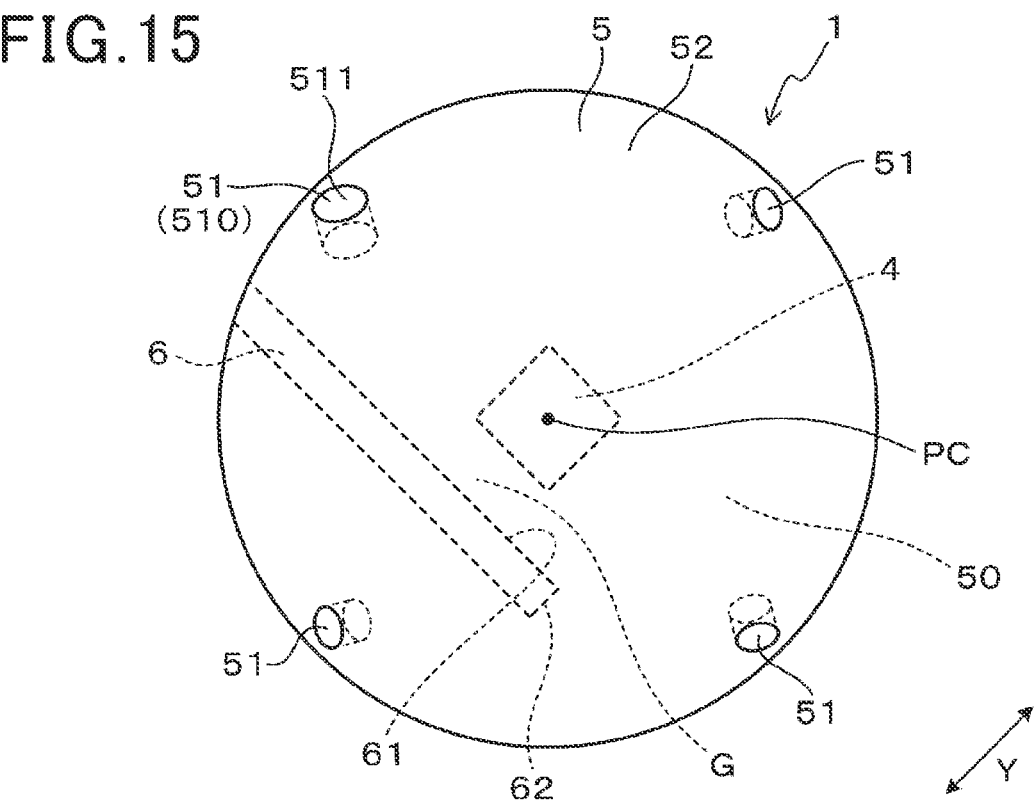
FIG. 15 is a plan view of a spark plug according to the sixth embodiment as viewed from the tip-end side thereof.

The following describes a sixth embodiment of the present disclosure with reference to FIG. 15. The configuration of the discharge gap G according to the sixth embodiment, which is changed from that of the discharge gap G according to the first embodiment, is based on a flat side of the center electrode 4 and a flat side of the ground electrode 6.

Specifically, the center electrode 4 has, as illustrated in FIG. 15, a substantially square pole shape. That is, the center electrode 4 has four flat sides. The center electrode 4 and the ground electrode 6 are arranged such that the flat facing side 61 of the ground electrode 6 and one of the four flat sides face each other while being substantially parallel to each other, resulting in the discharge gap G being formed between the flat facing side 61 of the ground electrode 6 and the one of the four flat sides of the center electrode 4. The center electrode 4 has one of any configurations as long as the center electrode 4 has at least one flat side that faces the facing side 61 of the ground electrode 6, which forms the discharge gap G between the flat side of the center electrode 4 and the facing side 61 of the ground electrode 6. For example, the center electrode 4 can have one flat side that faces the facing side 61 of the ground electrode 6, and have the other sides, each of which is curved. The other components of the sixth embodiment are substantially identical to the corresponding components of the first embodiment.

The discharge gap G formed by the substantially parallelly arranged the flat facing side 61 and one flat side of the center electrode 4, which face one another. This curbs expansion of the distance of the discharge gap G due to a wearing out of the ground electrode 6 and/or the center electrode 4, enabling the lifetime of the spark plug 1 to be longer.

The sixth embodiment additionally achieves the same advantageous benefits as stated for the first embodiment.

The center electrode 4, which has a substantially cylindrical shape and an outer peripheral surface, can include a chip mounted onto the outer peripheral surface thereof. The chip can have a flat side arranged to face the facing side 61 to be parallel thereto. This modified spark plug 1 can achieve the same advantageous benefits as stated for the sixth embodiment.

The present disclosure is not limited to the above embodiments, and can be applied to various embodiments within the scope of the present disclosure.

While the illustrative embodiments of the present disclosure have been described herein, the present disclosure is not limited to the embodiments and their configurations described herein. Specifically, the present disclosure includes various modifications and/or alternatives within the scope of the present disclosure. In addition to various combinations and forms, other combinations and forms including one or more/less elements thereof are also within the inventive principle and scope of the present disclosure.

What is claimed is:

1. A spark plug for an internal combustion engine, the spark plug having an axial direction and comprising:
    a tubular insulator having a tip-side end;
    a center electrode having one side and a tip-side end, the center electrode being disposed inside the insulator with the tip-side end of the center electrode protruding outwardly from the tip-side end of the insulator;
    a tubular housing that has a tip-side end and retains the insulator thereinside;
    a ground electrode having a stationary end and a projection-end edge opposite to the stationary end, and one side; and
    a plug cover mounted to the tip-side end of the housing to define a sub-chamber between the plug cover and the tip-side end of the housing,
    wherein:
    the stationary end of the ground electrode is mounted to the tip-side end of the housing;
    the projection-end edge of the ground electrode projects to be located in the sub-chamber such that the one side of the ground electrode serves as a facing side facing the one side of the center electrode, resulting in a discharge gap being formed between the facing side of the ground electrode and the one side of the center electrode;
    the plug cover has formed therethrough at least one injection hole that enables the sub-chamber to communicate with an outside thereof, the at least one injection hole having a center axis;
    the center axis of the at least one injection hole is inclined with respect to a radial direction of the spark plug as viewed in the axial direction of the spark plug;
    the at least one injection hole serves as a ground-directed injection hole arranged to face the facing side of the ground electrode, and an extension line of the center axis of the at least one ground-directed injection hole intersects with the facing side of the ground electrode at an intersection point;
    the facing side of the ground electrode has a closer region closer to the projection-end edge of the ground electrode than the intersection point is; and
    the closer region of the facing side intersects with the extension line of the center axis of the ground-directed injection hole at a predetermined angle as viewed in the axial direction of the spark plug, the predetermined angle being an obtuse angle.

2. The spark plug according to claim 1, wherein:
the facing side of the ground electrode has one of a flat surface and an inwardly concave surface; and
the intersection point is located on one of the flat surface and the inwardly concave surface of the facing side.

3. The spark plug according to claim 1, wherein:
the stationary end of the ground electrode is arranged on an opposite side of the center electrode from the projection-end edge of the ground electrode as viewed in a facing direction in which the ground electrode is aligned to face the center electrode.

4. The spark plug according to claim 1, wherein:
the at least one injection hole comprises a plurality of injection holes formed through the plug cover, one of the plurality of injection holes serving as the ground-directed injection hole;
each of the plurality of injection holes has an inner diameter; and
the inner diameter of the ground-directed injection hole is greater than the inner diameter of each of the plurality of injection holes except for the ground-directed injection hole.

5. An internal combustion engine comprising:
a main chamber;
a spark plug according to claim 1, the plug cover having an outer peripheral surface, the spark plug being arranged such that the outer peripheral surface of the plug cover is exposed in the main chamber; and
an injector configured to directly spray fuel in the main chamber, wherein:
the spark plug is arranged such that a fuel-containing flow including the fuel sprayed from the injector during a compression stroke of the internal combustion engine is directed toward an outer opening of the ground-directed injection hole.

6. An internal combustion engine comprising:
a main chamber; and
a spark plug according to claim 1, the plug cover having an outer peripheral surface, the spark plug being arranged such that the outer peripheral surface of the plug cover is exposed in the main chamber, wherein:
the spark plug is arranged such that an outer opening of the ground-directed injection hole is directed toward an upstream side of an airflow formed in the main chamber.

7. The spark plug according to claim 1, wherein:
the at least one injection hole comprises a plurality of injection holes formed through the plug cover, one of the plurality of injection holes serving as the ground-directed injection hole; and
an inner-diameter of the ground-directed injection hole is 1.2 to 1.4 times more than the inner diameter of each of the other injection holes.

8. The spark plug according to claim 1, wherein:
the at least one injection hole comprises a plurality of injection holes formed through the plug cover; one of the plurality of injection holes serving as the ground-directed injection hole; and
the extension line of the center axis of each of the plurality of injection holes extends while not passing through the center electrode.

9. The spark plug according to claim 1, wherein:
the at least one injection hole comprises a plurality of injection holes formed through the plug cover one of the plurality of injection holes serving as the ground-directed injection hole;
as viewed in the axial direction, an extension line of the center axis of each of the injection holes is inclined by an acute angle with respect to a virtual line that is defined to extend in the radial direction of the spark plug while passing through the plug center axis and any injection hole; and
the acute angle made between the extension line of the center axis of each of the injection holes and the corresponding virtual line is set to a constant acute angle.

10. The spark plug according to claim 1, wherein the predetermined angle is more than or equal to 120 degrees as view in the axial direction.

11. The spark plug according to claim 1, wherein:
a direction in which the facing side of the ground electrode is aligned to face the tip-side end of the center electrode is a facing direction; and
as viewed in the facing direction, the intersection point is located to be closer to the stationary end of the ground electrode than the center electrode is.

12. The spark plug according to claim 1, wherein:
a direction in which the facing side of the ground electrode is aligned to face the tip-side end of the center electrode is a facing direction; and
as viewed in the facing direction, a length of the shortest distance between the intersection point and the center electrode is smaller than the diameter of the center electrode.

13. The spark plug according to claim 1, wherein:
a direction in which the facing side of the ground electrode is aligned to face the tip-side end of the center electrode is a facing direction; and
as viewed in the facing direction, the intersection point is located to overlap with the center electrode at least partially.

14. The spark plug according to claim 1, wherein:
a direction in which the facing side of the ground electrode is aligned to face the tip-side end of the center electrode is a facing direction; and
as viewed in the facing direction, the intersection point is located to be closer to the projection-end edge of the ground electrode than the center electrode is.

* * * * *